(12) United States Patent
Wang et al.

(10) Patent No.: US 9,262,349 B2
(45) Date of Patent: Feb. 16, 2016

(54) EFFICIENT MEMORY CONTENT ACCESS

(75) Inventors: Herjen Wang, Sunnyvale, CA (US); Lei Chen, Sunnyvale, CA (US); Ngok Ning Chu, Los Altos, CA (US); Johnson Yen, Fremont, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 13/603,076

(22) Filed: Sep. 4, 2012

(65) Prior Publication Data
US 2014/0068164 A1    Mar. 6, 2014

(51) Int. Cl.
*G06F 12/00* (2006.01)
*G06F 13/16* (2006.01)

(52) U.S. Cl.
CPC .................................. *G06F 13/1647* (2013.01)

(58) Field of Classification Search
CPC .................................. G06F 13/00; G11C 16/00
USPC ......................................................... 711/104
See application file for complete search history.

(56) References Cited

U.S. PATENT DOCUMENTS 7,539,076 B1 *   5/2009   Vernenker et al. ....... 365/230.05

FOREIGN PATENT DOCUMENTS

WO    WO2011070262  A1    6/2011

* cited by examiner

*Primary Examiner* — Yong Choe
(74) *Attorney, Agent, or Firm* — Suiter Swantz pc llo

(57) ABSTRACT

A memory content access interface may include, but is not limited to: a read-path memory partition; a write-path memory partition; and a memory access controller configured to regulate access to at least one of the read-path memory partition and the write-path memory partition by an external controller.

12 Claims, 6 Drawing Sheets

|  | Function | Config | # of Bits | Type | Component |
|---|---|---|---|---|---|
| Read path | LDPC ROM | 64 | 42 | 2688 VVROMSV64M8X42B1HS | DEC |
|  | LDPC SRAM | 64 | 42 | 2688 V111HDSBV64M4X42B1HS |  |
|  | Interleaver map L-ROM | 96 | 64 | 6144 VVROMSV96M8X64B1HS | ITLV |
|  | Interleaver map L-SRAM | 96 | 64 | 6144 V111HDSBV96M4X64B1HS |  |
|  | De-interleaver HD L-ROM | 96 | 64 | 6144 VVROMSV96M8X64B1HS | HDQ |
|  | De-interleaver HD S-RAM | 96 | 64 | 6144 V111HDSBV96M4X64B1HS |  |
|  | Interleaver map (G_ROM) (512B) | 96 | 72 | 6912 VVROMSV96M8X72B1HS | LEH |
|  | Interleaver map (G_SRAM) | 96 | 72 | 6912 V111HDSBV96M4X72B1HS |  |
|  | Ybuffer SRAM | 4096 | 432 | 1769472 V111HDWV4096M4X216B4HS | Y Buffer |
| Write path | Interleaver map L-ROM | 96 | 64 | 6144 VVROMSV96M8X64B1HS |  |
|  | Interleaver map L-SRAM | 96 | 64 | 6144 V111HDSBV96M4X64B1HS |  |
|  | Interleaver map (G_ROM) | 96 | 72 | 6912 VVROMSV96M8X72B1HS | ENC |
|  | Interleaver map (G_SRAM) | 96 | 72 | 6912 V111HDSBV96M4X72B1HS |  |
|  | Encoder ROM (LDPC) | 96 | 96 | 9216 VVROMSV192M8X10B1HS |  |
|  | Encoder SRAM | 96 | 96 | 9216 V111HDSBV96M4X96B1HS |  |

FIG. 3

| Function | Address Range | Bits per row |
|---|---|---|
| LDPC SRAM | 32'h0100_0000 -- 32'h01ff_ffff | 672 |
| Interleaver map L_SRAM | 32'h0200_0000 -- 32'h02ff_ffff | 64 |
| De-interleaver HD L_SRAM | 32'h0300_0000 -- 32'h03ff_ffff | 64 |
| Interleaver map G_SRAM | 32'h0400_0000 -- 32'h04ff_ffff | 288 |
| Interleaver L-SRAM | 32'h0500_0000 -- 32'h05ff_ffff | 64 |
| Interleaver G_SRAM | 32'h0600_0000 -- 32'h06ff_ffff | 288 |
| Encoder SRAM | 32'h0700_0000 -- 32'h07ff_ffff | 96 |
| Ybuffer SRAM | 32'h0800_0000 -- 32'h08ff_ffff | 864 |

FIG. 4

EFFICIENT MEMORY CONTENT ACCESS

SUMMARY

A memory content access (MCA) interface may enable programmability of low-density priority check (LDPC) code so the performance can be enhanced. Further, interleaver and de-interleaver functions can also be optimized through this interface. Software can program functional modules with dynamic linking library via an MCA.

BRIEF DESCRIPTION OF DRAWINGS

The numerous advantages of the disclosure may be better understood by those skilled in the art by referencing the accompanying figures in which:

FIG. 3 shows an exemplary physical memory configuration;

FIG. 4 shows an exemplary memory address map;

DETAILED DESCRIPTION

Figure 1:
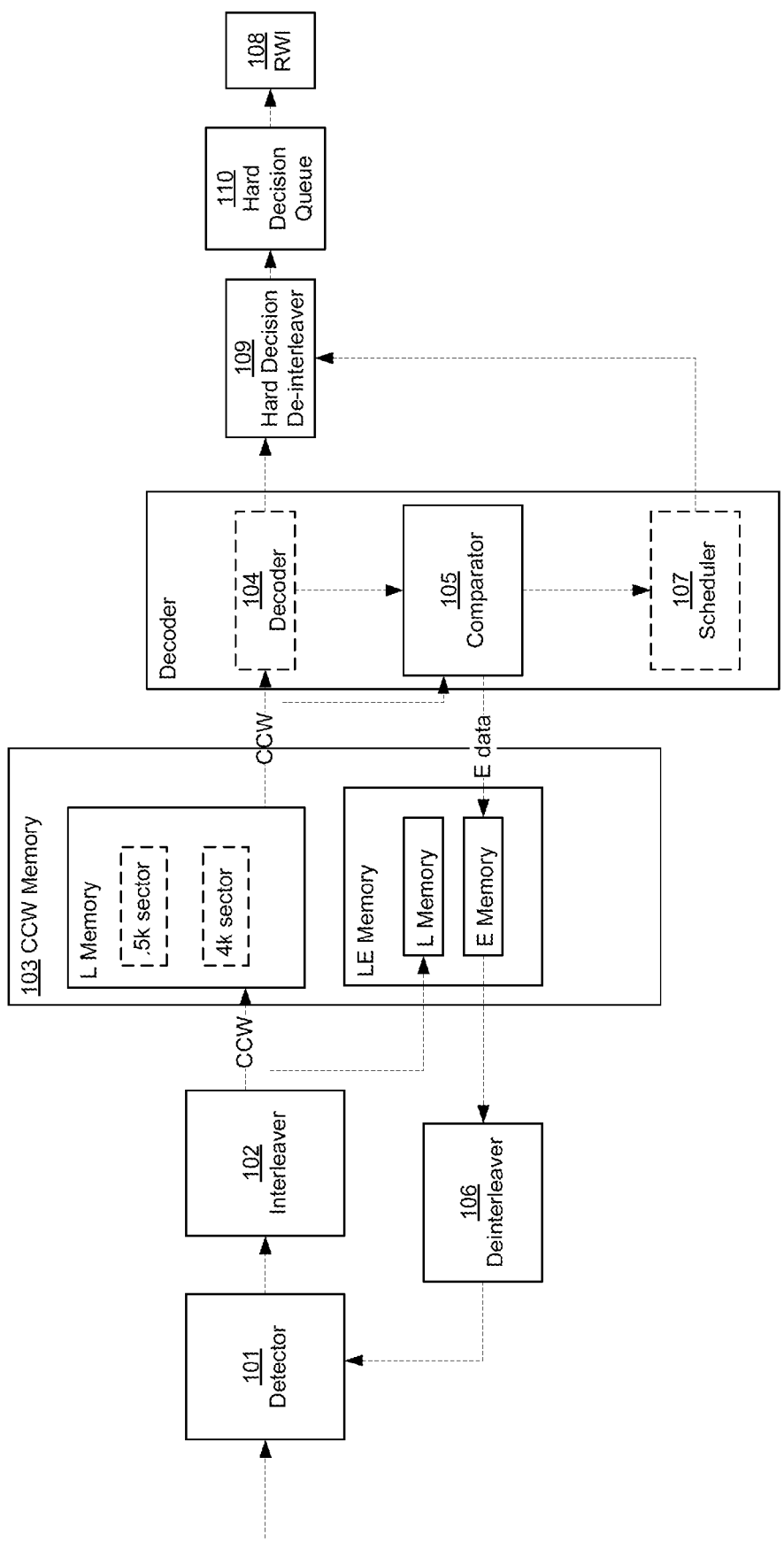
FIG. 1 shows a hard-decision decoding system.

Referring to FIG. 1, a system 100 for hard-decision decoding is shown. The system 100 may receive input data from a source at a detector 101. The detector 101 may provide the input data to an interleaver 102. The interleaver 102 may interleave the input data according to a given interleaving scheme to form at least one soft-decision component codeword (CCW) which may be stored to a CCW memory 103.

The CCW memory 103 may include an L memory partition 103-1 and an LE memory partition 103-2. The L memory partition 103-1 may store at least one CCW including log likelihood ratio data (L data) received from the interleaver. The L memory partition 103-1 may be a 0.5 k sector or a 4 k sector. For a 0.5 k sector, one sector includes one codeword. For the 4 k sector, one sector is one codeword composed of four CCWs (i.e. one sector is equal to four CCWs).

Following storage of at least one CCW to the L memory partition 103-1, the CCW may be provided to a decoder 104. The decoder 104 may decode the CCW according to a decoding scheme (e.g. a low-density priority check (LDPC) decoding scheme) and determine a convergence of the CCW (e.g. by comparison of a decoder converge signal to a threshold convergence value). Detection of a convergence of the CCW may be indicative that the "hard" decision component of a "soft" decision CCW has been likely been correctly determined and may be suitable for computations by a read/write interface 105 (RWI).

Specifically, if a decoder converge signal is high it may be indicative that a current CCW has converged. For 0.5 k sector, because this sector is inherently converged, the decoded hard decision data associated with the CCW may be passed to the HDQ. For 4 k sector, only when all four CCWs of one sector are all converged can the hard decision data associated with the CCW may be passed to the HDQ. If one or more CCWs have not converged, extrinsic data (E data) (i.e. error in the output of the decoder 104 minus error in the input data) may be employed to facilitate convergence.

The E data may be provided to a local de-interleaver 106 that may interleave the E data according to the given interleaving scheme. The de-interleaved E data may be provided to the detector 101 thereby by completing a first convergence iteration for the CCW. The system 100 may carry out additional convergence operations as described above with respect to the E data until the E data reaches a given convergence threshold or the system 100 completes a threshold number of convergence iterations as determined by a scheduler 107. Detection of a convergence of the CCW may be indicative that the "hard" decision component of a "soft" decision CCW has been likely been correctly determined and may be suitable for computations by a read/write interface 108 (RWI).

Upon reaching the convergence threshold or the iteration threshold maintained by the scheduler 107, the scheduler 107 may signal a hard-decision de-interleaver 109 (HDDLV) to query the decoder 104 to obtain the decoded CCW. Upon receipt of such a signal, the hard-decision de-interleaver 109 may de-interleave the decoded CCW according to the given interleaving scheme and provide the de-interleaved decoded CCW to a hard-decision queue 110 (HDQ). Once all CCW of a given data sector have converged to a likely "hard" decision value and been stored to the hard-decision queue 110, the hard-decision queue 110 may provide the data sector to the read/write interface 108 for further processing.

Figure 2:
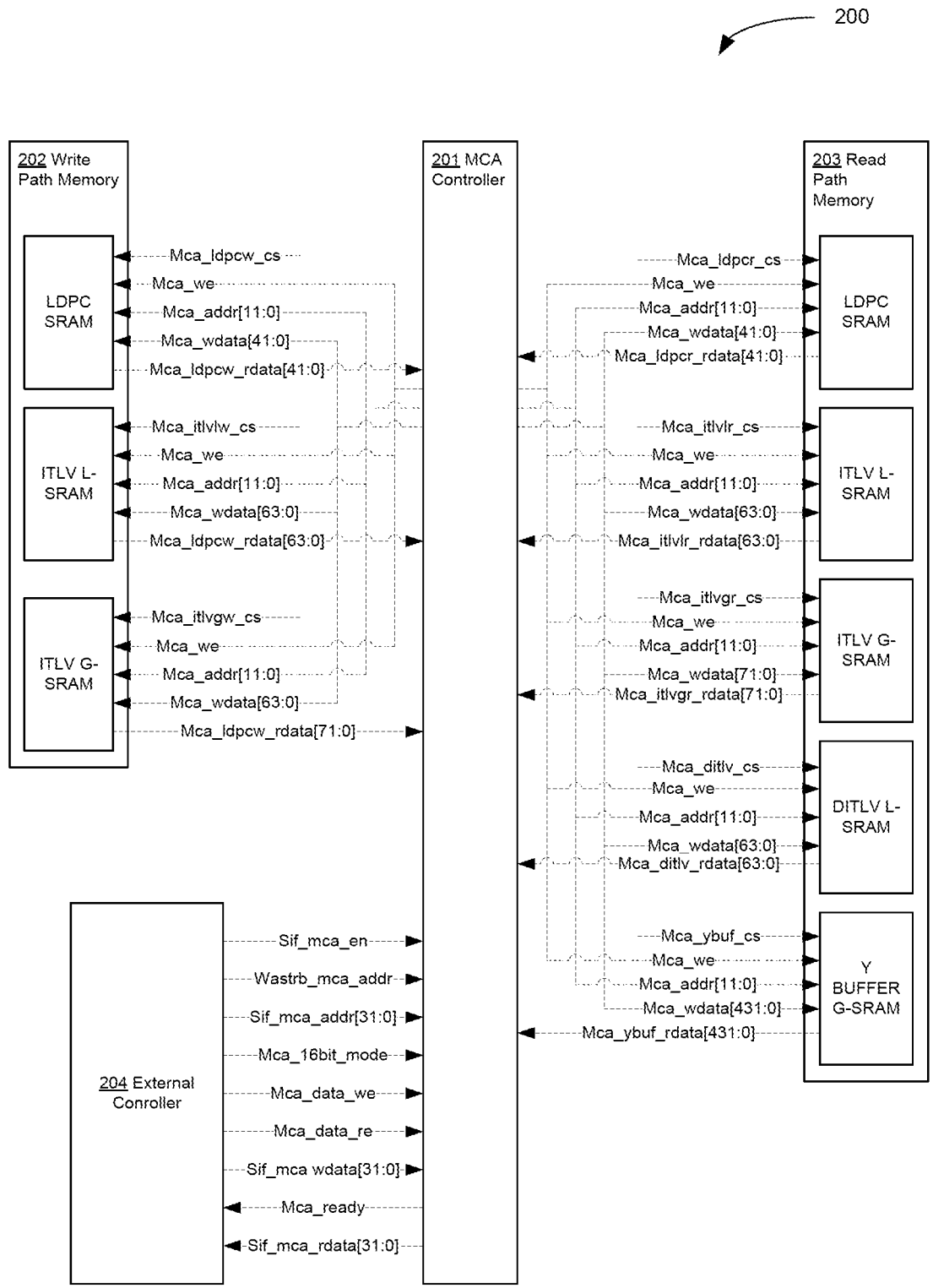
FIG. 2 shows a memory content access controller.

Referring to FIG. 2, an MCA interface 200 is shown. The MCA interface 200 may include an MCA access controller 201, write path memory 202 and read path memory 203. The MCA access controller 201 of the MCA interface 200 may allow an external controller 204 to access the internal SRAM of the write path memory 202 and the read path memory 203. The write path memory 202 may include an LDPC static random-access memory (RAM), an local interleaver (ITLV) SRAM (L-SRAM), and a global ITLV SRAM (G-SRAM). The read path memory 203 may include an LDPC SRAM, an ITLV L-SRAM, an ITLV G-SRAM, a local de-interleaver (DITLV) SRAM (L-SRAM) and a global Y Buffer SRAM (G-SRAM).

Referring to FIG. 3, an exemplary physical memory configuration for various sectors of the write path memory 202 and the read path memory 203 is shown. Referring to FIG. 4, an exemplary memory address map for various sectors of the write path memory 202 and the read path memory 203 is shown.

Referring again to FIG. 2, the access to the internal SRAM of the write path memory 202 and the read path memory 203 may be through both an sif address register (i.e. "Sif_mca_addr") and sif data register (i.e. "mca_data") maintained by the MCA access controller 201 and programmable by the external controller 204. This feature may be enabled by software when programming via an MCA enable bit (i.e. "sif_mca_en"). When sif_mca_en is set, all other accesses to internal SRAM may be prohibited. The interface may be synced to register clock (e.g. Advanced High-Performance Bus (AHB) clock).

Referring to FIG. 2, various interface signals between the MCA access controller 201 and an external controller 204 will be described. As described above, access to the internal SRAM of the write path memory 202 and the read path memory 203 may be enabled by an sif_mca_en signal. A single pulse strobe signal (i.e. "Wastrb_mca_addr") may be received by the MCA access controller 201 causing the MCA access controller 201 to latch a new memory row address. The memory row address may be provided by an address signal (i.e. "sif_mca_addr"). The sif_mca_addr signal may be a 32-bit memory row address. The top 8 bits may be addressed to differentiate among various memories, while the 12 least-significant bits may be indicative of a memory row. The MCA access controller 201 may further receive a 16-bit mode signal (i.e. "Mca__16 bit_mode") which may toggle the MCA access controller 201 between using all 32 bits of a 32-bit bus and using only the lower 16 bits of the 32-bit bus.

A write-enable signal ("Mca_data_we") may be provided to the MCA access controller 201 by the external controller 204 indicating that data on a 32-bit write data input signal (i.e. "sif_mca_wdata[31:0]") is ready to be written to the Y Buffer. The Mca_data_we signal may be a flip-flop signal that may be asserted when software writes to an sif_mca_data register of the external controller 204. Upon receipt of a corresponding ready signal associated with the Y Buffer (i.e. "Mca_ready") from the MCA access controller 201, data from the sif_mca_wdata[31:0] signal may be written to the Y Buffer. The Mca_data_we signal may be de-asserted when the Mca_ready signal is asserted.

Similarly, a read-enable signal ("Mca_data_re") may be provided to the MCA access controller 201 indicating that data is requested from the Y Buffer by the external controller 204. The Mca_data_re signal may be a flip-flop signal that may be asserted when software reads an sif_mca_data register of the external controller 204. Upon receipt of a corresponding ready signal (i.e. "Mca_ready") associated with the Y Buffer (i.e. "Mca_ready"), data may be read from the Y Buffer and output on 32-bit read output signal (i.e. "sif_mca_rdata[31:0]"). The Mca_data_re signal may be de-asserted when the Mca_ready signal is asserted.

The Mca_ready signal may be a flip-flow signal that is asserted for one clock period in a write cycle but for two clock periods in a read cycle.

Further, various internal signals within the MCA access controller 201 will be described. The MCA access controller 201 may employ a client select signal (i.e. "Mca_xxx_cs" where xxx is selected from LDPC read ("ldpcr"), interleaver L-SRAM read ("inlvlr"), interleaver G-SRAM read ("inlvgr"), de-interleaver L-SRAM read ("ditlv"), Y Buffer read ("ybuf"), LDPC write ("ldpcw"), interleaver L-SRAM write ("inlvlw"), and interleaver G-SRAM write ("inlvgw")) to select between the various client memory elements of the write path memory 202 and the read path memory 203.

The MCA access controller 201 may employ a shared write enable signal (i.e. "mca_we"). The MCA access controller 201 may employ a 12-bit shared row address bus (i.e. "mca_addr[11:0]"). The MCA access controller 201 may employ a 64-bit shared write data bus (i.e. "mca_wdata[63:0]").

The MCA access controller 201 may employ a read data bus for each client (i.e. "Mca_xxx_rdata" where xxx is selected from LDPC read ("ldpcr"), interleaver L-SRAM read ("inlvlr"), interleaver G-SRAM read ("inlvgr"), de-interleaver L-SRAM read ("ditlv"), Y Buffer read ("ybuf"), LDPC write ("ldpcw"), interleaver L-SRAM write ("inlvlw"), and interleaver G-SRAM write ("inlvgw").

Figure 5:
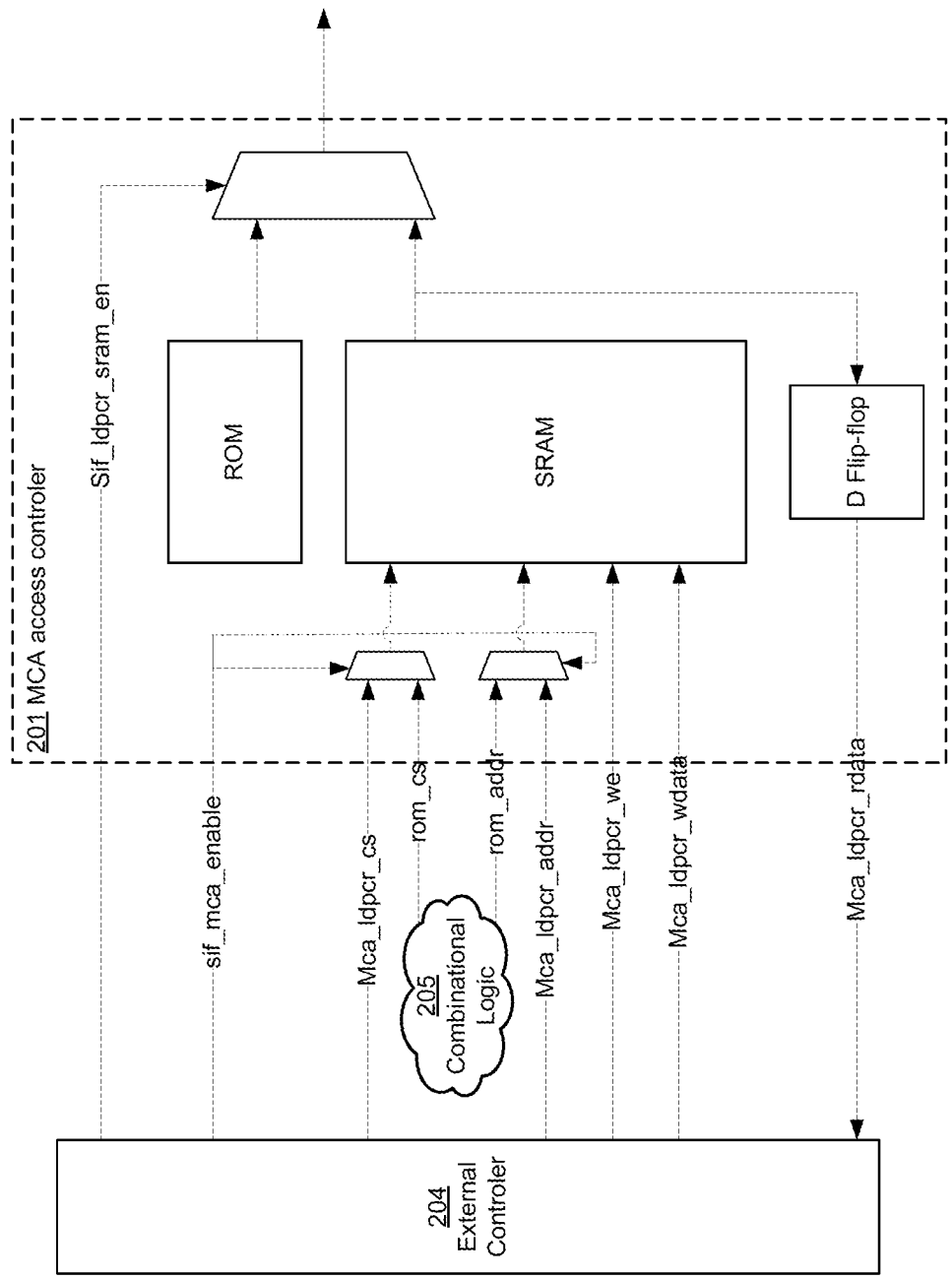
FIG. 5 shows a memory content access multiplexing configuration.

Referring to FIG. 5, an exemplary multiplexing configuration for the memory elements of the write path memory 202 and the read path memory 203 of the MCA access controller 201 allowing access by the external controller 204 is shown. In FIG. FIG. 4, the multiplexing configuration is shown with respect to the LDPC SRAM of the write path memory 202. However, it will be understood that such a multiplexing configuration may be employed with respect to each memory element of the write path memory 202 and the read path memory 203.

As shown in FIG. 5, the sif_mca_enable signal from the external controller 204 may be received at the MCA access controller 201. The sif_mca_enable signal may select between a client select/row address input signal pair from either the external controller 204 or from combinational logic 205. Upon selection between the external controller 204 and the combinational logic 205, the MCA access controller 201 may carry out read/write operations for the memory elements of the write path memory 202 and the read path memory 203 according to that selection. Further, the sif_xxx_sram_en signal from the external controller 204 may be received at the MCA access controller 201. The sif_xxx_sram_en signal may select between ROM memory output and SRAM memory output.

Figure 6:
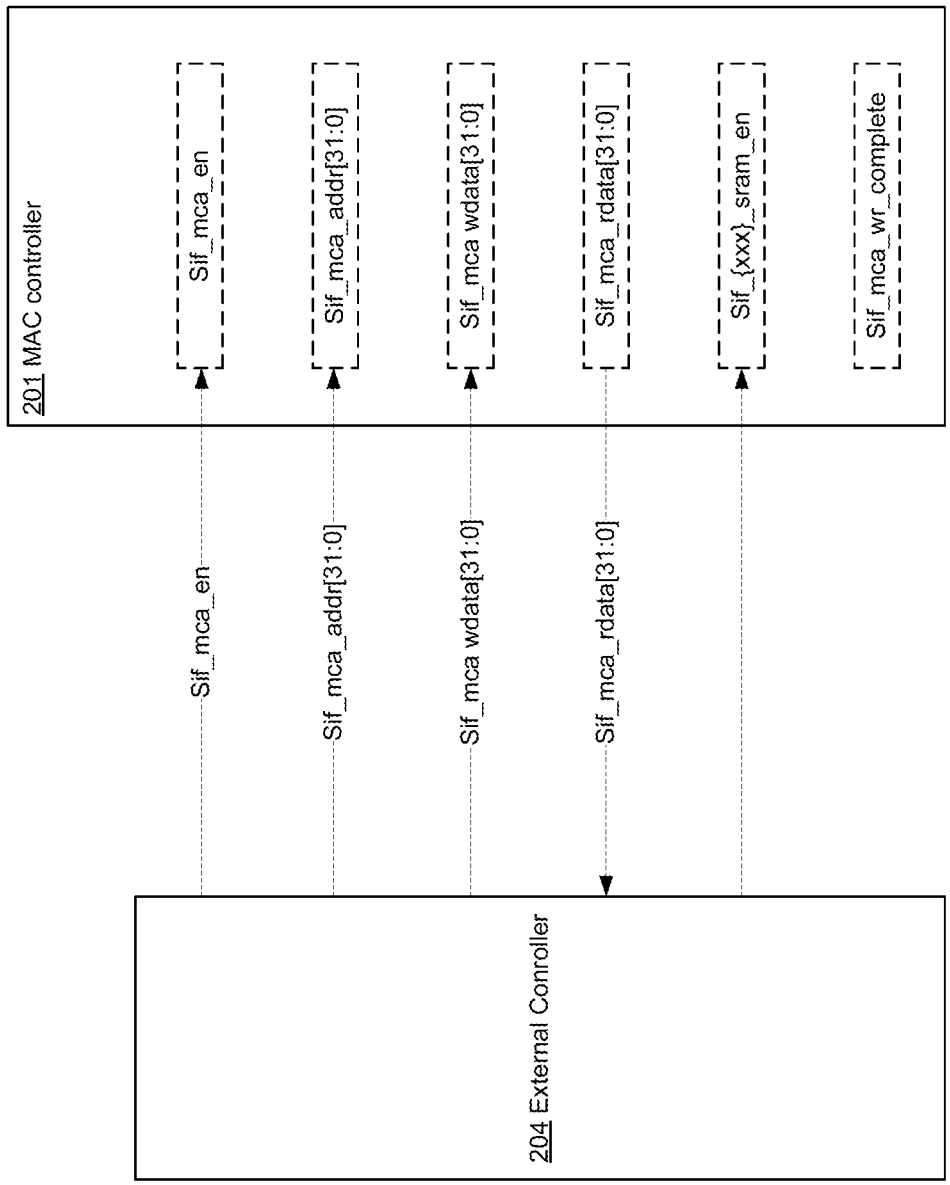
FIG. 6 shows memory content access controller register configuration.

Referring to FIG. 6, a register structure for the MCA access controller 201 is shown. An Sif_mca_en register may be employed to store the enable bit for the MCA interface 200. An Sif_mca_addr[31:0] register may store a memory address to be accessed. This register may be maintained in the normal register space. Sif_mca_rdata and Sif_mca_wdata registers may store data to be read from memory or written to memory respectively. An Sif_mca_wr_complete register may be a status register maintaining a value indicative of whether the last row of data has been written to memory. An Sif_xxx_sram_en register may store a selection between ROM memory output and SRAM memory output.

It is believed that the present invention and many of its attendant advantages will be understood by the foregoing description. It may be also believed that it will be apparent that various changes may be made in the form, construction and arrangement of the components thereof without departing from the scope and spirit of the invention or without sacrificing all of its material advantages. The form herein before described being merely an explanatory embodiment thereof. It may be the intention of the following claims to encompass and include such changes.

The foregoing detailed description may include set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

In addition, those skilled in the art will appreciate that the mechanisms of the subject matter described herein may be capable of being distributed as a program product in a variety of forms, and that an illustrative embodiment of the subject matter described herein applies regardless of the particular type of signal bearing medium used to actually carry out the distribution. Examples of a signal bearing medium include, but may be not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

Those having skill in the art will recognize that the state of the art has progressed to the point where there may be little distinction left between hardware, software, and/or firmware implementations of aspects of systems; the use of hardware, software, and/or firmware may be generally (but not always, in that in certain contexts the choice between hardware and software may become significant) a design choice representing cost vs. efficiency tradeoffs. Those having skill in the art will appreciate that there may be various vehicles by which processes and/or systems and/or other technologies described herein may be effected (e.g., hardware, software, and/or firmware), and that the preferred vehicle will vary with the context in which the processes and/or systems and/or other technologies may be deployed. For example, if an implementer determines that speed and accuracy may be paramount, the implementer may opt for a mainly hardware and/or firmware vehicle; alternatively, if flexibility may be paramount, the implementer may opt for a mainly software implementation; or, yet again alternatively, the implementer may opt for some combination of hardware, software, and/or firmware. Hence, there may be several possible vehicles by which the processes and/or devices and/or other technologies described herein may be effected, none of which may be inherently superior to the other in that any vehicle to be utilized may be a choice dependent upon the context in which the vehicle will be deployed and the specific concerns (e.g., speed, flexibility, or predictability) of the implementer, any of which may vary. Those skilled in the art will recognize that optical aspects of implementations will typically employ optically oriented hardware, software, and or firmware.

What is claimed is:

1. A memory content access interface comprising:
    a read-path memory partition;
    a write-path memory partition; and
    a memory access controller configured to regulate access to at least one of the read-path memory partition and the write-path memory partition by at least one external controller, the memory access controller including:
        at least one client-select multiplexer;
        at least one client memory address multiplexer,
        the at least one client-select multiplexer and the at least one client memory address multiplexer including a common enable signal.

2. The memory content access interface of claim 1, wherein the read-path memory includes:
    at least one of: low-density priority check (LDPC) static random access memory (SRAM), interleaver local SRAM or interleaver global SRAM.

3. The memory content access interface of claim 1, wherein the write-path memory includes:
    at least one of: low-density priority check (LDPC) static random access memory (SRAM), interleaver local SRAM, interleaver global SRAM, de-interleaver local SRAM or Y buffer global SRAM.

4. The memory content access interface of claim 1, wherein the memory access controller includes:
    at least one ROM/SRAM multiplexer.

5. A computer-implemented method comprising:
    receiving at least one request from an external controller for access to at least one of at least one write-path memory partition or at least one read-path memory partition;
    controlling access by the external controller to the at least one of at least one write-path memory partition and at least one read-path memory partition via:
        selecting at least one client of the at least one of at least one write-path memory partition and the at least one read-path memory partition; and
        selecting at least one memory address for the at least one client,
        wherein the selecting at least one client and the selecting at least one memory address for the at least one client occur via a first multiplexor and a second multiplexor each having a common enable signal.

6. The computer-implemented method of claim 5, wherein the read-path memory comprises:
    at least one of: low-density priority check (LDPC) static random access memory (SRAM), an interleaver local SRAM or interleaver global SRAM.

7. The computer-implemented method of claim 5, wherein the write-path memory comprises:
    at least one of: low-density priority check (LDPC) static random access memory (SRAM), interleaver local SRAM, interleaver global SRAM, de-interleaver local SRAM or Y buffer global SRAM.

8. The computer-implemented method of claim 5, wherein the controlling access by the external controller to the at least one of at least one write-path memory partition and at least one read-path memory partition includes:
    selecting between at least a ROM output and an SRAM output.

9. A computer-implemented system comprising:
    at least one computing device; and
    one or more instructions that, when implemented in the computing device, configure the computing device for:
    receiving at least one request from an external controller for access to at least one of at least one write-path memory partition or at least one read-path memory partition; and
    controlling access by the external controller to the at least one of at least one write-path memory partition and at least one read-path memory partition via:
        selecting at least one client of the at least one of at least one write-path memory partition and the at least one read-path memory partition; and
        selecting at least one memory address for the at least one client,
        wherein the selecting at least one client and the selecting at least one memory address for the at least one client occur via a first multiplexor and a second multiplexor each having a common enable signal.

10. The computer-implemented system of claim 9, wherein the read-path memory includes:
    at least one of: low-density priority check (LDPC) static random access memory (SRAM), interleaver local SRAM or interleaver global SRAM.

11. The computer-implement system of claim 9, wherein the write-path memory includes:
    at least one of: low-density priority check (LDPC) static random access memory (SRAM), interleaver local SRAM, interleaver global SRAM, de-interleaver local SRAM or Y buffer global SRAM.

12. The computer-implemented system of claim 9, wherein the controlling access by the external controller to the at least one of at least one write-path memory partition and at least one read-path memory partition includes:

selecting between at least a ROM output and an SRAM output.

\* \* \* \* \*